United States Patent
Larson et al.

(10) Patent No.: US 7,412,235 B2
(45) Date of Patent: Aug. 12, 2008

(54) SYSTEM AND METHOD FOR FAST DETECTION OF SPECIFIC ON-AIR DATA RATE

(75) Inventors: Gary Larson, Waseca, MN (US); Aaron Fitzgerald, Medford, MN (US); Kris Stroda, Waseca, MN (US)

(73) Assignee: Itron, Inc., Liberty Lake, WA (US)

( * ) Notice: Subject to any disclaimer, the term of this patent is extended or adjusted under 35 U.S.C. 154(b) by 190 days.

(21) Appl. No.: 10/931,945

(22) Filed: Sep. 1, 2004

(65) Prior Publication Data

US 2005/0057371 A1    Mar. 17, 2005

Related U.S. Application Data

(60) Provisional application No. 60/500,507, filed on Sep. 5, 2003, provisional application No. 60/598,158, filed on Aug. 2, 2004.

(51) Int. Cl.
*H04Q 7/20* (2006.01)
*H04B 17/00* (2006.01)

(52) U.S. Cl. .............. 455/422.1; 455/115.1; 455/456.1; 455/574; 455/343.5; 455/423; 455/226.1; 455/457; 455/67.7; 455/343.1; 455/67.11; 455/343.2

(58) Field of Classification Search .............. 455/115.1, 455/115.4, 67.11, 574, 343.1, 343.2, 343.5; 340/870.02, 870.03, 870.29, 310.01; 705/63
See application file for complete search history.

(56) References Cited

U.S. PATENT DOCUMENTS 5,507,040 A * 4/1996 Eaton et al. .............. 455/343.2
5,631,636 A   5/1997 Bane
5,675,614 A   10/1997 Wetters
5,684,472 A   11/1997 Bane
5,726,646 A   3/1998 Bane et al.
5,914,673 A   6/1999 Jennings et al.

FOREIGN PATENT DOCUMENTS

EP    0420295 A1    4/1991
EP    0797308 A2    3/1996

* cited by examiner

*Primary Examiner*—Charles N. Appiah
*Assistant Examiner*—Emem Stephen
(74) *Attorney, Agent, or Firm*—Patterson, Thuente, Skaar & Christensen, P.A.

(57) ABSTRACT

A system and method for fast detection of specific on-air data rates are disclosed which, in one example embodiment, enable endpoint devices in automatic meter reading (AMR) systems to quickly determine the existence of over-the-air information that is specifically targeted to a unique class of AMR devices. An endpoint device utilizing the digital squelch circuit arrangement and algorithm of the invention can quickly and precisely determine if the AMR system is communicating with its class of AMR device by looking for a specific non-standard data rate present on the air. This method therefore allows for a significant improvement in battery life in two-way RF communication units by avoiding unnecessary data processing and data transmissions. The digital squelch method also enables even faster determination of inappropriate data rates and of no signal present situations, further improving battery life.

23 Claims, 6 Drawing Sheets

SYSTEM AND METHOD FOR FAST DETECTION OF SPECIFIC ON-AIR DATA RATE

RELATED APPLICATION

This application claims the benefit of U.S. Provisional Application No. 60/500,507 filed Sep. 5, 2003, and U.S. Provisional Application No. 60/598,158, filed Aug. 2, 2004, which are incorporated herein in their entirety by reference.

COMPACT DISC

A compact disc containing codes and information describing one embodiment of the invention disclosed herein is submitted herewith and is hereby incorporated by reference. The compact disc contains the following programs:

| TITLE | SIZE IN BYTES | DATE OF CREATION |
| --- | --- | --- |
| decoder.h.txt | 1,485 | Aug. 31, 2004 |
| FlagMasks.h.txt | 13,683 | Aug. 31, 2004 |
| functions.c.txt | 38,985 | Aug. 31, 2004 |
| functions.h.txt | 3,341 | Aug. 31, 2004 |
| Gold_EP.c.txt | 7,776 | Aug. 31, 2004 |
| Gold_EP.h.txt | 6,728 | Aug. 31, 2004 |
| hardware.c.txt | 34,262 | Aug. 31, 2004 |
| hardware.h.txt | 2,557 | Aug. 31, 2004 |
| init.h.txt | 1,769 | Aug. 31, 2004 |
| interrupts.c.txt | 22,679 | Aug. 31, 2004 |
| main_functions.c.txt | 13,766 | Aug. 31, 2004 |
| Main_Functions.h.txt | 1,530 | Aug. 31, 2004 |
| Messages.c.txt | 29,597 | Aug. 31, 2004 |
| Messages.h.txt | 1,308 | Aug. 31, 2004 |
| Parameters.h.txt | 6,910 | Aug. 31, 2004 |
| PinMasks.h.txt | 5,096 | Aug. 31, 2004 |
| protocol.c.txt | 44,724 | Aug. 31, 2004 |
| protocol.h.txt | 1,598 | Aug. 31, 2004 |
| rotate.s43 | 1,008 | Aug. 31, 2004 |

FIELD OF THE INVENTION

The invention relates generally to radio frequency (RF) communication systems, and more particularly to RF communication schemes used with remote automatic meter reading (AMR) devices and systems.

BACKGROUND OF THE INVENTION

Automatic meter reading (AMR) systems are generally known in the art. Utility companies, for example, use AMR systems to read and monitor customer meters remotely, typically using radio frequency (RF) communications. AMR systems are favored by utility companies and other users because the systems increase the efficiency and accuracy of collecting readings and managing customer billing. For example, using an AMR system for the monthly reading of residential gas, electric, or water meters eliminates the need for a utility employee to physically enter each residence or business where a meter is located to transcribe a meter reading by hand.

There are several different ways in which current AMR systems are configured. In a fixed network, endpoint devices at meter locations communicate with readers that collect readings and data using RF. Here and throughout this document, the term "endpoint device" will be used to generally refer to the meter and meter interface unit that communicates with the reader as a single device, although in various embodiments the meter and meter interface unit may be distinct devices in electrical communication but not physical proximity with each other. There may be multiple fixed intermediate readers located throughout a larger geographic area on utility poles, for example, with each endpoint device associated with a particular reader and each reader in turn communicating with a central system. Other fixed systems utilize only one central reader with which all endpoint devices communicate. In a mobile environment, a handheld or otherwise mobile reader with RF communication capabilities is used to collect data from endpoint devices as it is moved from place to place.

U.S. Pat. No. 5,914,673, for example, relates to an AMR system of the type used for reading utility meters by using a fixed RF network. The system is a network comprised of multiple cells, with each cell containing a single data concentrator unit and a typically large number of meter interface units. In operation, each meter interface unit is assigned a unique time displacement number and responds to a meter reading request from a data concentrator unit based upon its time displacement number.

A concern regarding both fixed networks and mobile environments is endpoint battery consumption. Each endpoint device is typically equipped with a battery-powered meter interface unit that communicates with the reader. To contribute to the overall system goal of increased efficiency and accuracy of meter reading, it is desirable to prolong the meter interface battery life to reduce time and expense maintaining and servicing the batteries in the meter interfaces. Since using a battery with a larger capacity is generally not a viable option due to cost and space considerations, the preferred method with which to increase battery life is to reduce battery consumption by the meter interface. This goal may be accomplished in part by operating the meter interface in a "sleep" or reduced power mode when communication with the reader is not expected or required.

U.S. Pat. No. 5,726,646 is directed to a method and apparatus for activating and accessing remote meter interface devices. A meter reading device initiates communication with a meter interface unit by transmitting a request on a communication channel. The meter interface unit is operable between an active and inactive state to reduce power consumption and is periodically activated to monitor a communication channel for channel activity. The request from the meter reading device includes a unit identifier, and the meter interface unit is activated at a particular time period and detects communication activity on the communication channel originating from the meter reading device.

Other methods of reducing battery consumption have also been attempted in which the endpoint devices respond only to signals above a particular threshold or only to signals that include some type of system identifier. These methods help to reduce power consumption by limiting the signals that a particular endpoint device will respond to.

U.S. Pat. No. 5,684,472 is directed to a method and apparatus for remotely accessing meter status information in a meter reading system. Communications between battery powered meter interface units and a meter reading device occur at a first data rate, while communications between the externally powered meter interface units and the meter reading device occur at a second data rate different than the first data rate. Communications between battery powered meter interface units and externally powered meter interface units occur at different rates so that more frequent communication with externally powered meter interface units does not result in extended receiver on-time for the battery powered meter interface units.

Other systems use analog squelch techniques based on received signal strength indicators to preserve battery power consumption. These methods, however, are prone to falsing because of interference from other sources. It is also difficult to set the received signal strength threshold level accurately in systems having many endpoint devices because the environmental conditions vary at different locations and change over time and temperature, which cannot be easily or automatically compensated for by the system. This leads to the setting of either an artificially high threshold value, which will miss some endpoint queries and lower system quality of service due to the receiver threshold being above the noise floor, or the setting of a low threshold, which will deplete the battery due to excessive falsing.

Systems in which the endpoint devices look for a specific system identifier in the demodulated data require that the endpoint receiver be brought up long enough to recover data and retrieve bit and frame synchronization. This depletes the battery in a system in which the endpoint receiver must repeat this process every few seconds.

There is, therefore, a need in the industry for a system and method of operating AMR systems that conserves battery life while not sacrificing communication capabilities or performance.

SUMMARY OF THE INVENTION

The invention disclosed and described herein substantially meets the aforementioned needs of the industry by providing a system and method for fast detection of specific on-air data rates. In one embodiment, the system and method enable an endpoint device to quickly determine the existence of over-the-air information that is specifically targeted to a unique class of AMR devices. The digital squelch system and the method of implementation conserve battery life in the endpoint device and are an improvement over prior art analog squelch systems and methods that only look for the presence of an RF signal over a specific threshold.

In one embodiment, an endpoint device utilizing the digital squelch circuitry and algorithm of the invention can quickly and precisely determine if the AMR system is communicating with its class of AMR device by looking for a specific non-standard data rate present on the air. This method therefore allows for a significant improvement in battery life in two-way units. The digital squelch technique can be extended to multiple similar data rates in the same geographic area to further extend endpoint device battery life. This is accomplished because the digital squelch method is sensitive over a very narrow range, allowing for multiple unique classes of endpoint devices with very similar RF and data transfer performance. Further, the digital squelch method enables even faster determination of inappropriate data rates and of no signal present situations, in which case only noise would be detected.

In operation, embodiments of the digital squelch system and method enable an endpoint device to evaluate the data rate of an inbound signal and quickly determine if the signal has the correct data rate for a specific class of endpoint devices. This is an improvement over the prior art because it does not require bit or frame synchronization to operate properly, making it much faster than the methods previously described. The method also does not depend on the level of RF being received. This enables the system to operate well at low signal levels, avoiding false triggering at high interfering signal levels and making it well suited to ISM bands or in licensed channels where strong adjacent channel interference may be encountered.

The above summary of the invention is not intended to describe each illustrated embodiment or every implementation of the invention disclosed herein. The figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
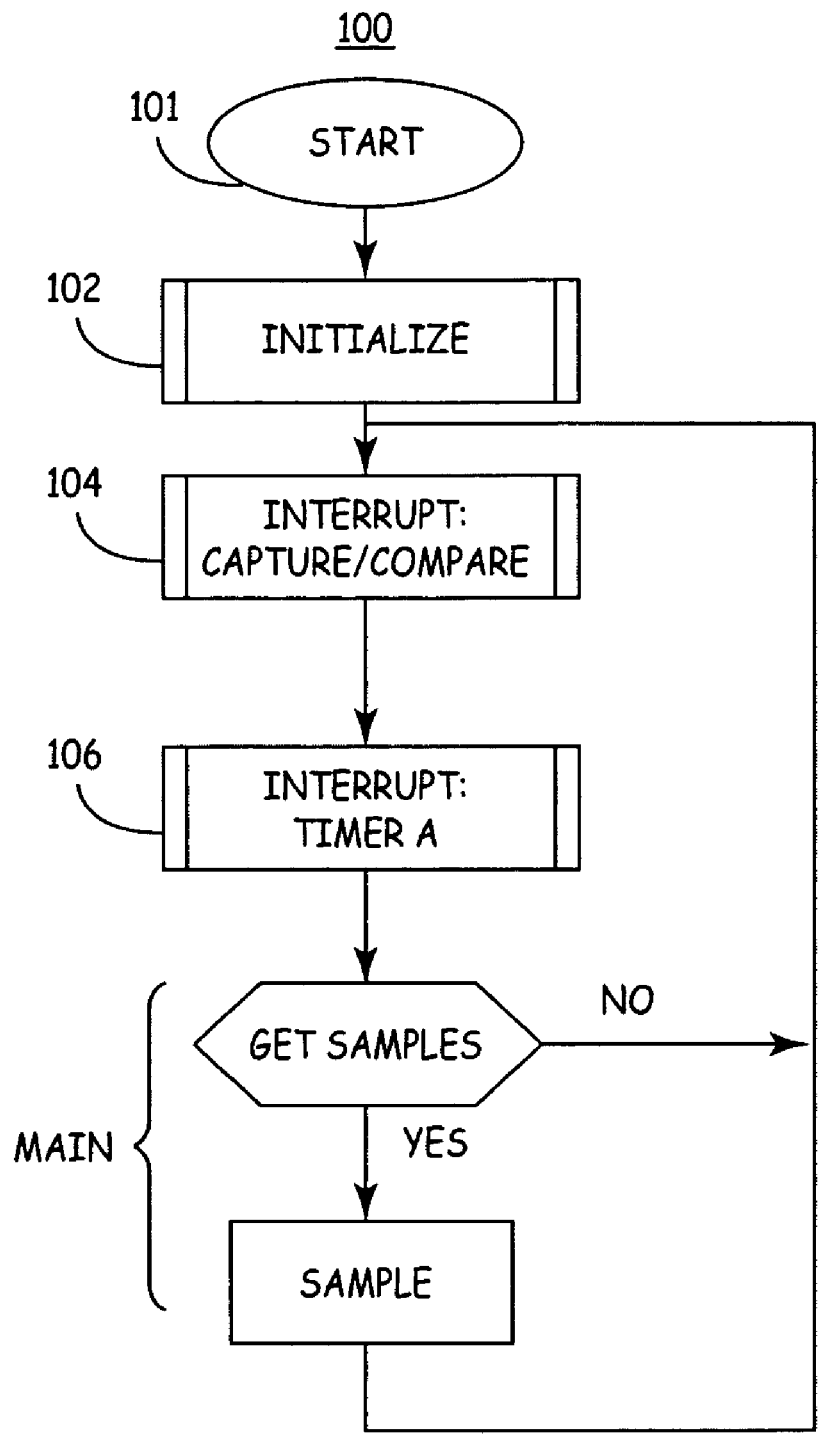
FIG. 1 is a flow chart of one example embodiment of the digital squelch method of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

Implementation of the digital squelch method disclosed and described herein provides a more robust AMR system with higher quality of service while also reducing costs by increasing battery life in endpoint devices. The invention can be more readily understood by reference to FIGS. 1-6, the following description, and the accompanying compact disc and its contents as set forth above. While the invention is not necessarily limited to such an application, the invention will be better appreciated using a discussion of example embodiments in such a specific context.

As briefly described above, AMR systems typically comprise a plurality of endpoint devices, for example utility consumption meters, geographically distributed in a local area. AMR systems are typically most useful in residential and business environments in which meter densities are relatively high and in which it would be costly and time-consuming for a utility employee to physically visit each meter. A relatively larger geographic area, for example a city, could include more than one AMR system operating in close geographic and communicative proximity. In AMR systems using RF communication schemes, each endpoint device is in electrical communication with a fixed or mobile reader or an intermediate endpoint device to routinely collect meter readings and exchange data and other information. In areas in which more than one AMR system are operating, or in applications in which the reader is requesting communication with specific devices, each endpoint device must determine whether over-the-air communications are directed to it or to its class in order to properly respond to the communication. The digital squelch method of the invention described herein enables AMR system endpoint devices to quickly and efficiently analyze over-the-air communications to identify those communications that are targeting a particular device or class of devices.

FIG. 1 is a flow chart of one example embodiment of a digital squelch identification technique 100 of the invention. Digital squelch technique 100 is implemented by each of a plurality of microprocessor circuitry equipped endpoint devices operating within a fixed network AMR system utilizing RF communications for data gathering and transfer. More particularly, the digital squelch identification technique provides for fast detection of a specific Manchester on-air data rate that enables an endpoint device to quickly determine the existence of over-the-air information that is specifically targeted to its unique class of AMR devices.

Technique 100 is implemented in each endpoint device when an RF signal is detected 101 to determine whether a response or other action is required. In initialization step 102, endpoint device ports and timers are set up and a capture/compare process is started. Capture/compare interrupt 104 is the step that follows in which the digital squelch identification or filtering process takes place and is described in further detail below. If a valid signal is detected by the endpoint device in step 104, the digital squelch filtering process is terminated and the decoding process is initiated in order to act upon the detected signal. A valid signal is one targeting a particular endpoint device or device class. If a valid signal is not detected in step 104, the digital squelch filtering process ends and control is passed back to the calling function with a "NO SIGNAL" indication. In one embodiment, a "NO SIGNAL" condition is determined very quickly, on the order of ten expected bit widths or less, and the endpoint device powers down quickly in order to conserve battery life.

During the digital squelch portion of process 100, hardware and software associated with capture/compare interrupt step 104 collects edges and sorts the timestamps in order to determine whether the inbound signal comprises a particular non-standard data rate. If the appropriate non-standard data rate is detected, the inbound signal is directed to that particular endpoint device and further communications, for example an outbound signal including a consumption reading, are initiated as determined by the inbound signal contents. When the endpoint device begins processing incoming signal data, capture/compare interrupt 104 is turned off and a Timer A of interrupt step 106 is turned on. Timer A of interrupt 106 is used to mark a Manchester bit frame. In one example embodiment, the value for the start of the Manchester bit frame is loaded into a register at the end of a successful digital squelch process. This value is used to time the start and end of the Manchester bit frame, where phase was determined in the squelch process. FIG. 1 also illustrates a re-sampling loop 108 for sampling of the incoming signal data rate until no more samples are needed or requested.

Figure 2:
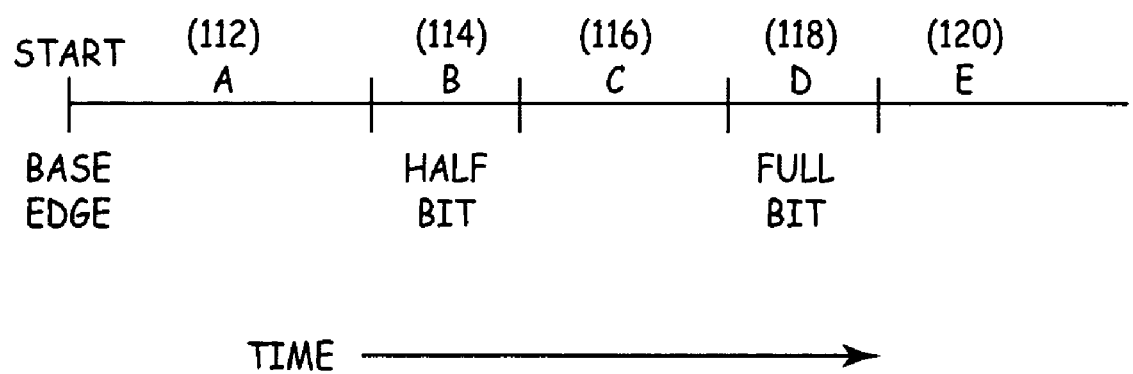
FIG. 2 is a timing diagram of one example embodiment of the digital squelch method of the invention.

FIG. 2 is a timing diagram 200 of one embodiment of the digital squelch method and system of the invention, wherein the system is configured at capture/compare interrupt step 104 to collect edges and sort the timestamps as follows. In one embodiment, all communications from the central radio to the endpoint devices in the system are Manchester-encoded. Manchester encoding is a synchronous clock encoding technique used to encode the clock and data of a synchronous bit stream. As used herein, a Manchester bit frame is defined as the period of time from the start to the end of one Manchester data bit. In one embodiment, and in accordance with Manchester encoding, a transition must occur in the center of the Manchester bit frame. At a distance of one half bit from a captured edge, there may or may not be a transition, as the edge may or may not be in the middle of the Manchester bit.

A full bit is the time from the start to the end of one Manchester data bit. In one example embodiment of the digital squelch method of the invention, there should be a transition at the full bit point. A base edge is the timestamp value of the edge from which the next edge is measured, and a zero edge is the first base edge. Bad edges are the total edges that do not fall into a half bit or a full bit category from the start of a detection cycle. Good edges are the total edges that fall into the half bit or full bit category from the start of a detection cycle. A good phase count is thus the total number of good edges that qualify as edges that can be used to determine phase; for example, two edges received that are one full bit apart and have no edges between them are two good phase edges. In other embodiments, non-return to zero (NRZ) or straight binary encoding is used.

Accordingly, an edge at the start of timeframe A 112 is a base edge in the embodiment of FIG. 2. An edge detected during timeframe A 112 occurs too soon to be a good edge. If such an edge is detected, the bad edge count register is incremented and the good phase count register is cleared. A good half bit occurs at timeframe B 114. The good count is incremented and the edge at B 114 becomes the base edge plus or minus half of the error. If the previous good edge was not a possible clock edge, then the current edge becomes a possible clock edge. An edge detected during timeframe C 116 occurs too late for a half bit and too early for a full bit. At C 116, therefore, the bad count is incremented and the good phase count is cleared. A good full bit occurs at timeframe D 118. The good count and the good phase count are incremented and, because this is a clock edge, the edge in D 118 becomes the base edge plus or minus half of the error. An edge occurring during timeframe E 120 occurs too late to be a full bit. The bad count is incremented and this edge is the base edge, or zero edge. The phase count is also cleared.

Figure 3:
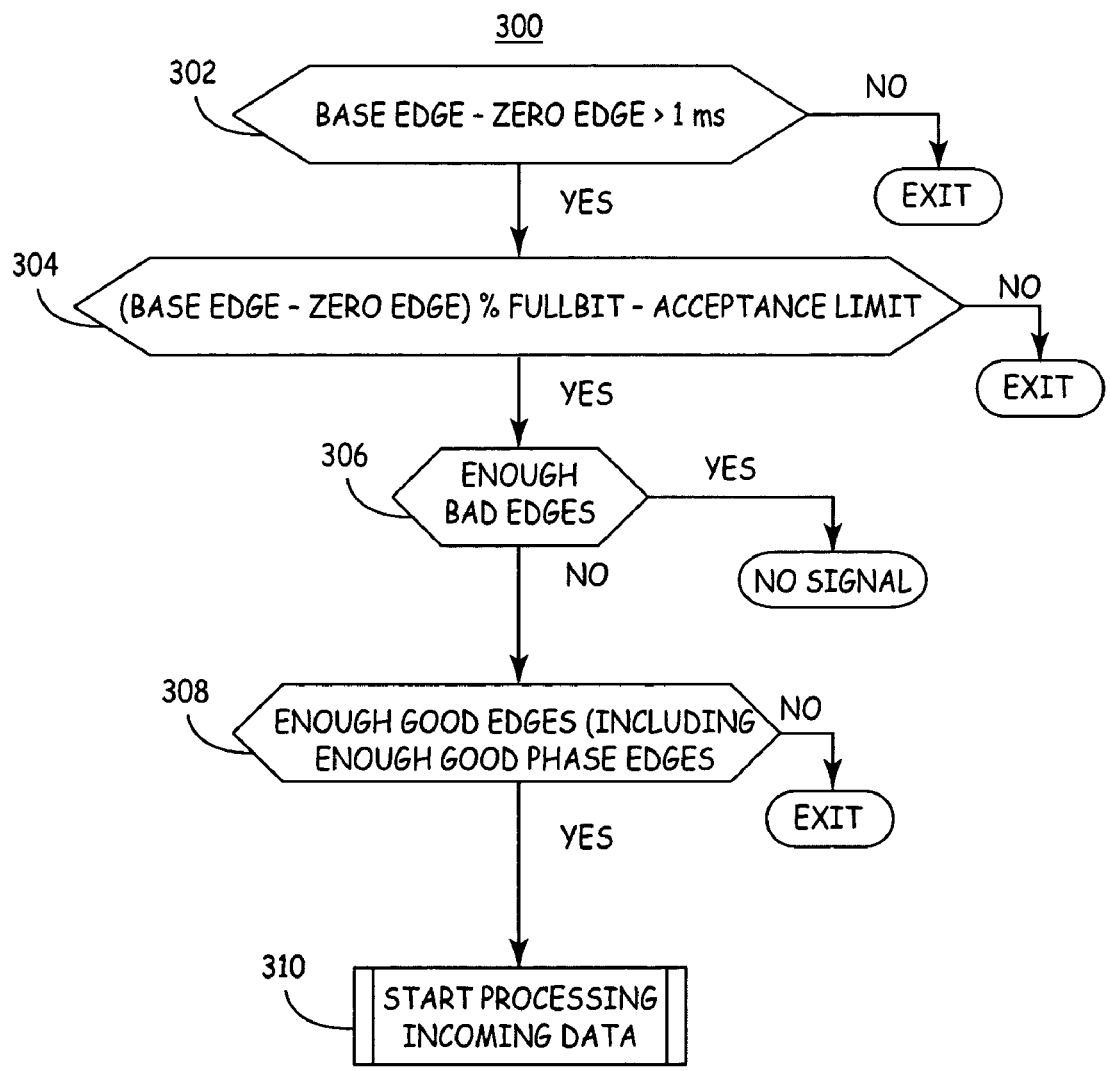
FIG. 3 is a flow chart of a selectivity test in accordance with one example embodiment of the invention.

After each edge is collected as above, a test is performed to improve selectivity and more accurately determine detection of a valid signal. FIG. 3 is a flowchart of one example embodiment of this selectivity test 300. First, the timing between the base edge and the zero edge is analyzed at step 302. If the value resulting from step 302 is within an acceptable limit at step 304, the bad edges are then reviewed at step 306. If enough bad edges have been detected in step 306, no valid incoming signal is present. Otherwise, the good edge count is then analyzed at step 308.

If test 300 is performed successfully, the inbound signal is considered valid and the receiving endpoint device begins processing the incoming signal data at step 310. Referring again to FIG. 1, when the endpoint device begins processing incoming signal data at step 310, capture/compare interrupt operation at step 104 is turned off and the Timer A of interrupt step 106 is turned on. Timer A of interrupt 106 is used to mark the Manchester bit frame. In this example embodiment, the value for the start of the Manchester bit frame is loaded into a register at the end of a successful digital squelch process. This value is used to time the start and end of the Manchester bit frame, where phase was determined in the squelch process. Through this method, the endpoint device is able to quickly determine whether over-the-air information is being targeted to its unique class of AMR device through the specific on-air data rate of the signal detected as described above.

Figure 4:
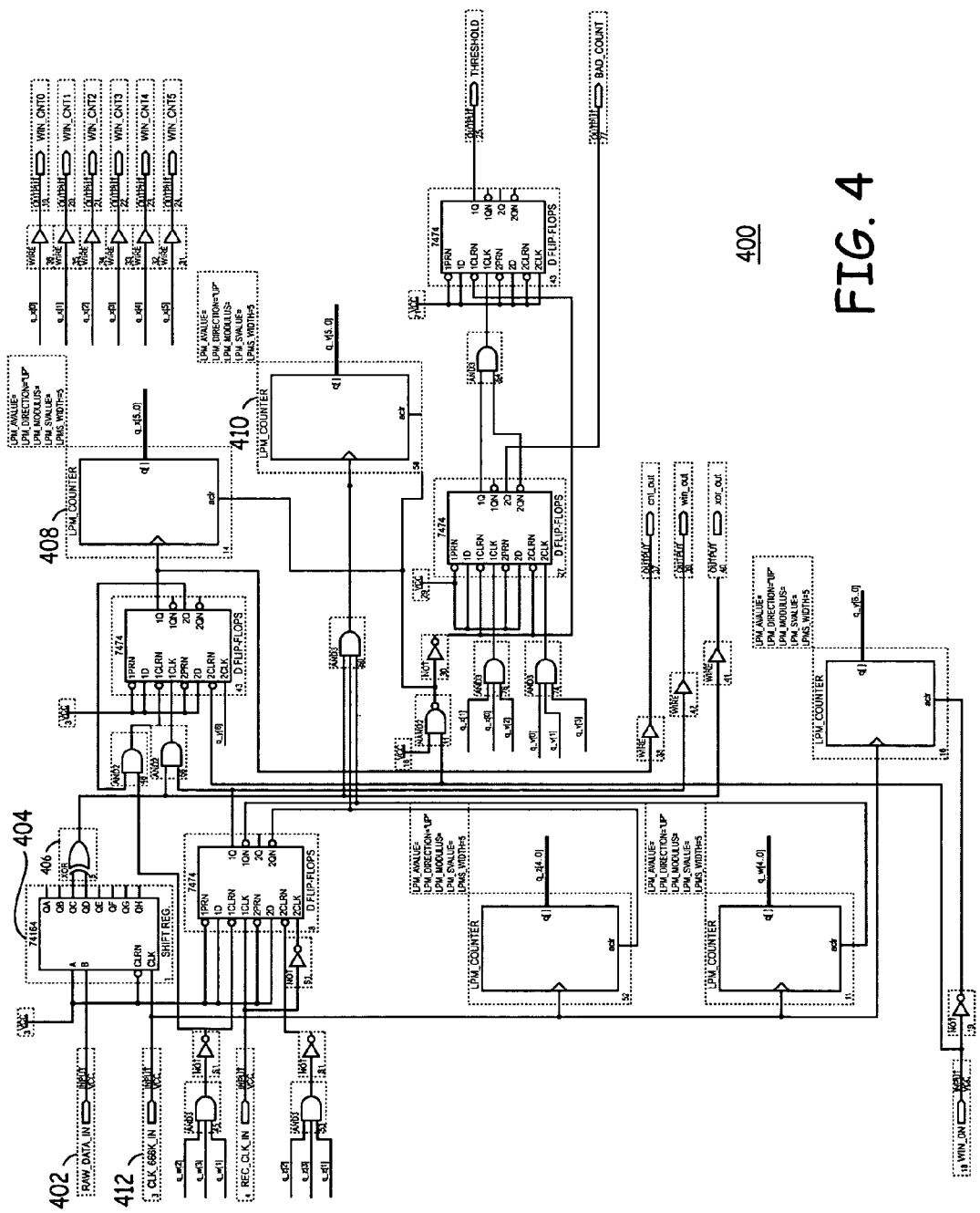
FIG. 4 is a hardware schematic of a dual windower in accordance with one example embodiment of the invention.
Figure 5:
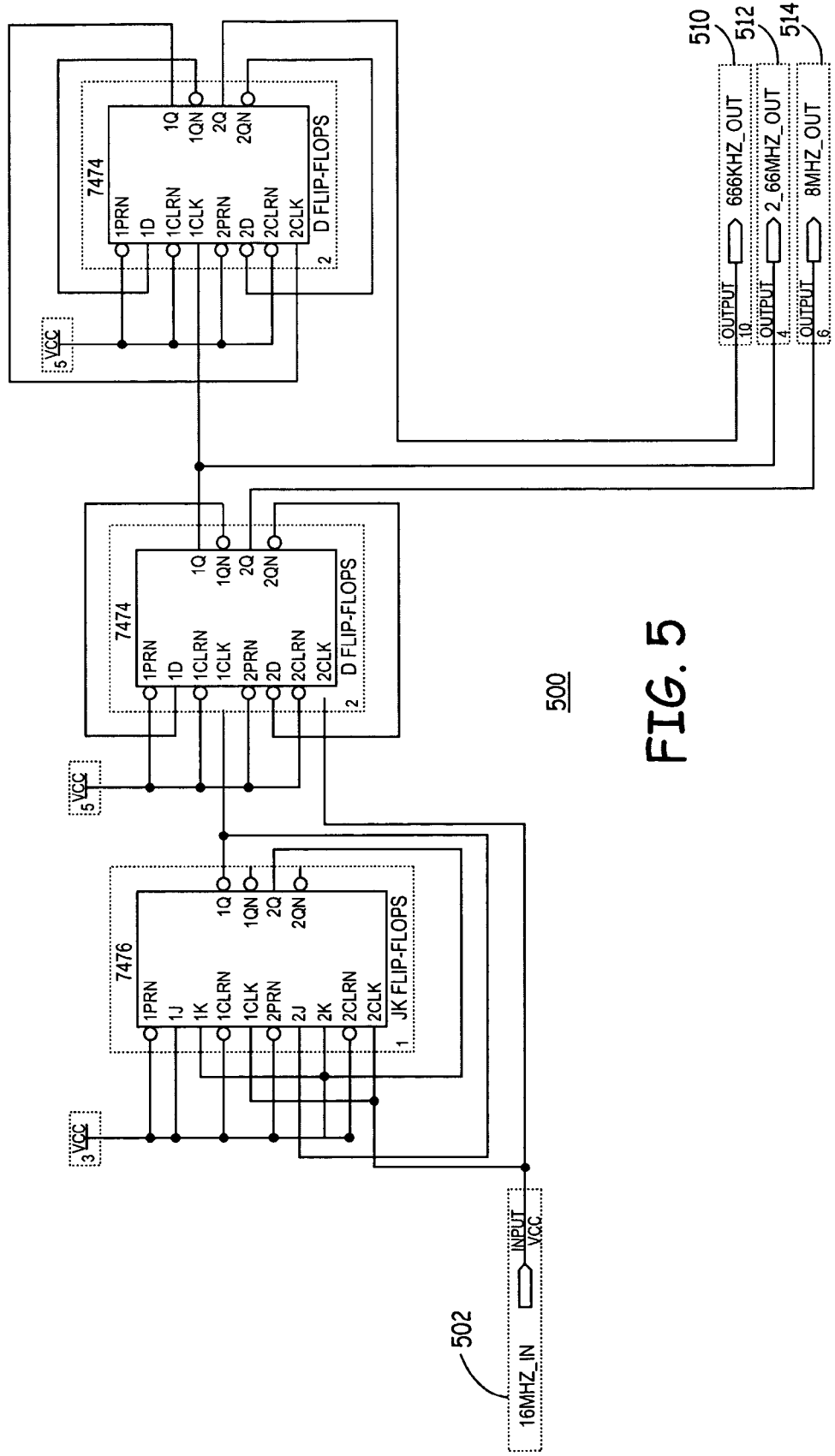
FIG. 5 is a hardware schematic of a divider circuit in accordance with one example embodiment of the invention.
Figure 6:
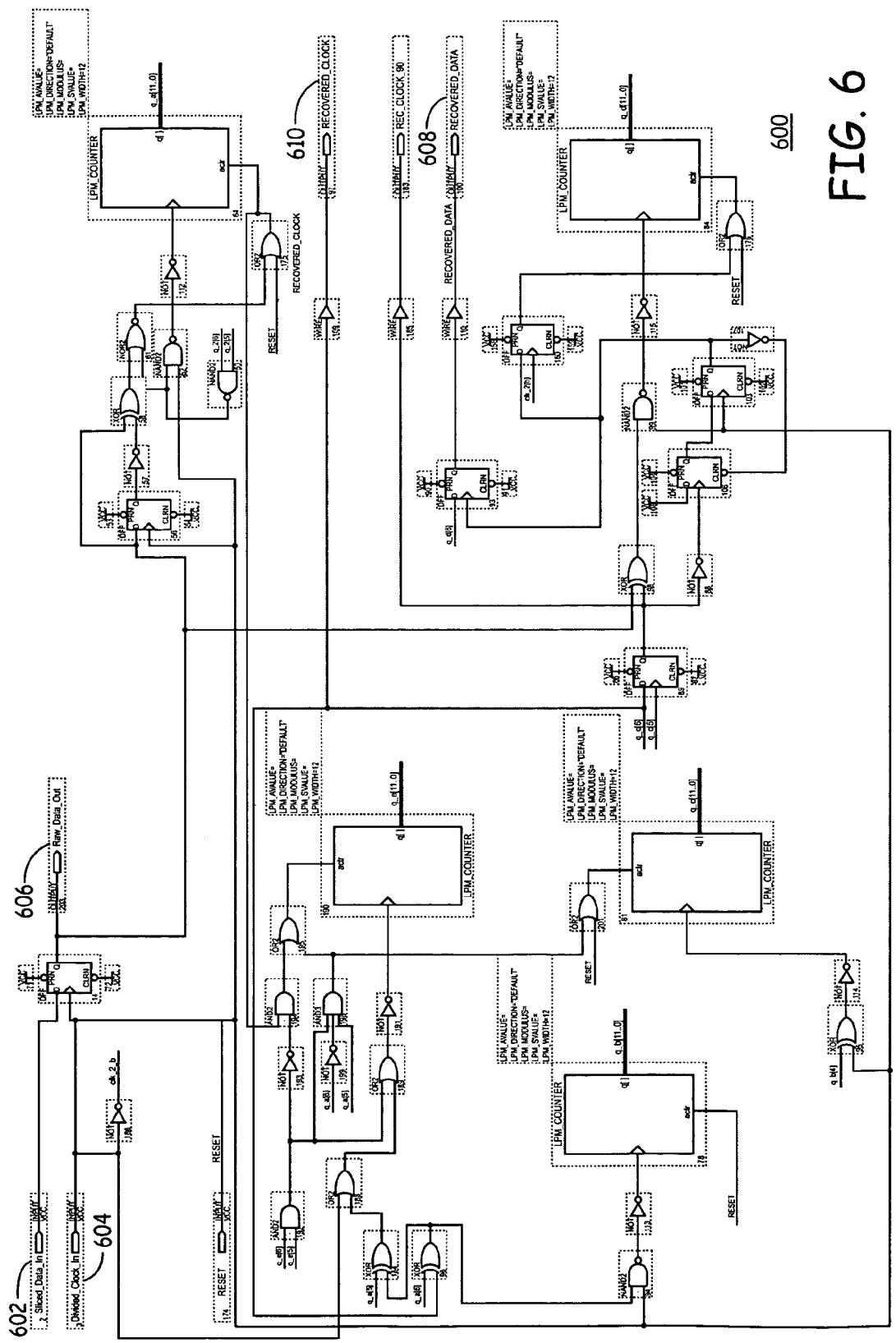
FIG. 6 is a hardware schematic of a decoder in accordance with one example embodiment of the invention.

FIGS. 4-6 are hardware schematics configured in accordance with one example embodiment of the invention. In particular, FIG. 4 is a hardware schematic of a dual windower (or edge detector); FIG. 5 is a hardware schematic of a divider circuit while FIG. 6 is a hardware schematic of a decoder in accordance with one example embodiment of the invention.

Referring now more particularly to edge detector circuit 400 of FIG. 4, raw data signal 402 is clocked into a shift register 404 at a rate much higher than the data rate. Signal 402 is a quantized or clock-synchronized version of data coming out of a data slicer (refer to FIG. 6), or a receiver returning a digital data stream. Shift register 404 is used to delay signal 402. The delayed data is then presented to a 2-bit EXCLUSIVE-OR gate 406, which finds data transitions, or edges. Windows are formed by counters 408 and 410 to evaluate the data transitions to determine, similarly to the software approach described above, if the data transitions fall into "good" windows or "bad" windows. Edge detector circuit 400 also receives its clock signal 412 from circuit 500 (see FIG. 5).

Thus, in operation, a good edge is detected and then the next several edges detected are analyzed to determine whether the edges fall within "good" windows of where the edge would be expected to be if the detected signal is at the data rate being sought. One of the goals is to accumulate a set number of good transitions, or transitions that would indicate a preferred data rate, before accumulating a set number of bad transitions that are transitions occurring outside of the windows accumulating good counts. If a subsequent edge falls within a window, counter 408, the "good count," is incremented. If an edge falls outside the window, it is a "bad count" and counter 410 is incremented. If counter 408 reaches a specified "good" value before counter 410 reaches a specified "bad" value, circuit 400 indicates that a valid data rate is present. If counter 410 reaches its value before counter 408, circuit 400 indicates that an invalid data rate, i.e. a data rate that is not the preferred or target data rate, is present, which indicates to the system that it is unnecessary to continue acquisition. The system will also cease detecting and analyzing edges if a predetermined acquisition timeout is reached in which no valid data rate has been detected.

These window widths or sizes are adjustable and customizable so as to allow for taking into account bit jitter and other anomalies, allowing optimization of the sensitivity and false rate. The good count and bad count values are also adjustable so as to optimize tradeoffs between speed, sensitivity, power consumption, and false rate, among other parameters. The data rate and other related parameters are also customizable.

FIG. 5 is a divider circuit 500. Circuit 500 derives the necessary clock frequencies to drive the rest of the circuitry. For example, circuit 500 receives as an input a 16 MHz clock signal 502. JK FLIP-FLOP 504 and D FLIP-FLOPS 506 and 508 of circuit 500 produce three output clock frequencies in one embodiment: a 666 kHz signal 510, a 2.66 MHz signal 512, and a 6 MHz signal 514. These are exemplary clock frequencies of one embodiment at a particular data rate, however other data rates may use different frequencies without departing from the spirit or scope of the invention.

FIG. 6 illustrates a decoder circuit 600, which extracts and tracks clock and data out of the incoming raw data signal. A sliced data signal 602 and divided clock signal 604 serve as inputs to circuit 600. Output raw data signal 606 is fed to edge detector circuit 400 (see FIG. 4). Decoder circuit 600 provides a recovered data signal 608 and recovered clock signal 610. The information in signals 608 and 610 is used upon detection of a valid incoming signal data rate by circuit 400.

The above-described implementation of one example embodiment of the digital squelch system and method of the invention can also be described as a floating window for the detection of new good edges, wherein a new good edge is used as the basis for finding the next good edge. Thus, the good window tends to float along as new edges are found. In another embodiment, a first edge is detected and all following edges are time-stamped and compared to the first edge. Modulo arithmetic is used to determine if the subsequent edges are multiples of that first edge and to then build an array of edge times. If the first edge fails to be a good edge where there are no other edges or not enough other edges are multiples, then the first edge can be discarded and the process repeated using the second edge, third edge, etc., up to as many edges as the CPU will accommodate.

In operation, the digital squelch scheme as described above in one example embodiment is implemented as part of a fixed network AMR system or in a mobile meter-reading environment. For example, in a mobile environment, endpoint devices may be located in residential homes and a reader may be located in a mobile utility vehicle that drives down streets adjacent the residential homes to collect readings. In such a system, the method of the invention enables the reader to quickly and accurately collect readings and data from system endpoints. If the utility vehicle is moving at a speed of about thirty miles per hour, the vehicle will travel approximately 440 feet in ten seconds. The vehicle will have a communications radius of approximately 500 feet with the expected power levels and receiver sensitivities in one embodiment. Each endpoint device will, on average, be in range of the vehicle for approximately twelve to twenty-five seconds in one embodiment. This is a sufficient amount of time to wake up the endpoint devices, identify the device, request a mobile data packet be sent, receive the mobile data packet, and, if necessary, potentially retry the request and receive portions of the digital squelch scheme. In other related embodiments, the digital squelch system and method of the invention is not necessarily limited to the embodiments described above and can be modified for use with different frequencies typically used in other North American, European, and other international locations.

The invention may be embodied in other specific forms without departing from the spirit of the essential attributes thereof; therefore the illustrated embodiments should be considered in all respects as illustrative and not restrictive, reference being made to the appended claims rather than to the foregoing description to indicate the scope of the invention.

What is claimed is:

1. An automatic meter reading (AMR) system comprising:
   at least one meter reading device adapted to transmit radio frequency (RF) communications having at least one predetermined target data rate for use by at least one of a plurality of endpoint devices; and
   at least one endpoint device of the plurality of endpoint devices, the at least one endpoint device having a meter interface module in communication with a meter device and adapted to receive the RF communications having the at least one predetermined target data rate and to reject non-target data rate RF signals that do not have any of the at least one target data rate and are not for use by the at least one endpoint device;
   the meter interface module including a digital squelch circuit arrangement adapted to distinguish from among the at least one predetermined target data rate and a non-predetermined non-target data rate in on-air RF communication signals, wherein the digital squelch circuit arrangement is adapted to determine occurrences of good edges indicative of the at least one predetermined target data rate and occurrences of bad edges indicative of the non-predetermined non-target data rate in the on-air RF communication signals, the squelch circuit arrangement further adapted to determine whether the on-air communication signals include a data rate that corresponds to the at least one predetermined target data rate by at least monitoring an edge count of the good edges and an edge count of the bad edges;

wherein the meter interface module is adapted to respond to a detection of the data rate of an inbound-RF communication signal corresponding to the at least one predetermined target data rate by conducting reception activity to receive that RF communication signal having the at least one target data rate and to respond to a detection of the data rate of an on-air RF communication signal not matching the target data rate by immediately discontinuing reception of that on-air RF communication signal having the non-target data rate.

2. The AMR system of claim 1, wherein the RF communications are Manchester-encoded and the digital squelch circuit arrangement is adapted to detect a specific Manchester on-air data rate of the inbound RF communication that matches the target data rate.

3. The AMR system of claim 1, wherein the inbound RF communication is encoded according to at least one encoding scheme selected from the group consisting of: Manchester encoding, non-return to zero encoding, and binary encoding.

4. The AMR system of claim 1, wherein upon detection of a signal the squelch circuit arrangement of the meter interface module is adapted to initialize a device timer of the at least one endpoint device and start a communication capture and compare sequence in the at least one endpoint device, the squelch circuit arrangement further adapted to filter incoming signals until a valid communication is detected, wherein a valid communication comprises an inbound signal having a data rate that matches the target data rate, and wherein the squelch circuit arrangement is further adapted to decode and process the valid communication for communication data.

5. The AMR system of claim 4, wherein a filtering arrangement of the squelch circuit arrangement is adapted to filter incoming communications upon detecting a base edge and a second edge so as to identify the second edge as a good edge or a bad edge as a function of a time of the edge, such that if the second edge is a good edge, a good count register of the filter arrangement is incremented, and if the second edge is a bad edge, a bad count register of the filter arrangement is incremented and the good count register is cleared; and clearing the good count register; and wherein the filter arrangement is adapted to detect and identify subsequent edges as good edges or bad edges until the target data rate is detected.

6. The AMR system of claim 5, wherein the squelch circuit arrangement is further adapted to perform a selectivity test after the second edge and subsequent edges are detected, wherein the selectivity test includes analysis of a time between the base edge and the second edge, a review of the bad count register and a review of the good count register to determine if the bad count register is below a predetermined limit.

7. The AMR system of claim 1, wherein the meter interface module of the endpoint device is adapted to include:

an extraction circuit adapted to receive and quantize an incoming data signal; and an edge detector circuit adapted to receive a quantized data signal from the extraction circuit and detect edges in the quantized data signal, wherein the edge detector circuit includes a first counter to track a number of good edges and a second counter to track a number of bad edges;

wherein the extraction circuit is adapted to pass a recovered clock signal and a recovered data signal to the edge detector circuit when the first counter reaches a first predetermined value, and wherein the extraction circuit is adapted to reject the incoming data signal when the second counter reaches a second predetermined value.

8. The AMR system of claim 7, further comprising a divider circuit adapted to derive a plurality of clock frequencies and pass at least one frequency to the extraction circuit and to the edge detector circuit.

9. A method for communicating with at least one endpoint device in an automatic meter reading (AMR) system, wherein the at least one endpoint device includes a meter device and a meter interface module adapted for radio frequency (RF) communications, the method comprising:

initializing a device timer of a digital squelch circuit arrangement of the meter interface module of the at least one endpoint device, wherein the squelch circuit arrangement is configured to respond differently to a predetermined at least one target data rate of an on-air signal transmitted for use by the endpoint device than to a non-predetermined non-target data rate of any other on-air signal;

filtering inbound RF communication signals at the at least one endpoint device until a valid communication is detected, wherein a valid communication comprises the inbound RF communication signal having a data rate that matches the target data rate, wherein the filtering includes monitoring the inbound RF communication signal to determine a count of good edges indicative of a data rate that matches the target data rate and monitoring the inbound RF communication signal to determine a count of bad edges indicative of a data rate that does not match the target data rate;

performing a communication capture sequence in the at least one endpoint device in response to a detection of the target data rate represented by the count of good edges exceeding the count of bad edges; and stopping communication activity in the at least one endpoint device in response to a detection of the non-target data rate represented by the count of bad edges exceeding the count of good edges.

10. The method of claim 9, wherein the filtering of the incoming communications further comprises:

detecting a base edge;

detecting a second edge and identifying the second edge as a good edge or a bad edge based upon a time of the edge, if the second edge is a good edge, incrementing a good count register, if the second edge is a bad edge, incrementing a bad count register; and detecting and identifying subsequent edges as good edges or bad edges until the target data rate is detected, until determining the target data rate is not present, or until a predetermined acquisition timeout is reached.

11. The method of claim 10, further comprising:

performing a selectivity test after the second edge and subsequent edges are detected, wherein the selectivity test includes:

analyzing a time between the base edge and the second edge;

reviewing the bad count register; and reviewing the good count register if the bad count register is below a predetermined limit.

12. The method of claim 9, wherein the starting of the communication capture and compare sequence includes detecting and receiving inbound RF communications.

13. The method of claim 12, wherein the receiving of the inbound RF communications includes receiving data that is encoded according to at least one of the encoding schemes selected from the group consisting of: Manchester encoding, non-return to zero encoding, and binary encoding.

14. An endpoint meter device for use in an automatic meter reading system, wherein the endpoint meter device includes a meter interface module adapted to filter inbound radio frequency (RF) communication signals received from a meter reading device, the endpoint meter device comprising:
an extraction circuit adapted to receive and quantize an incoming data signal; and
an edge detector circuit adapted to receive a quantized data signal from the extraction circuit and detect edges in the quantized data signal, wherein the edge detector circuit includes a first counter to track a number of good edges indicative of a predetermined at least one target data rate of an on-air signal transmitted for use by the endpoint meter device and a second counter to track a number of bad edges indicative of a non-predetermined non-target data rate of any other on-air signal;
wherein the extraction circuit is adapted to pass a recovered clock signal and a recovered data signal to the edge detector circuit when the first counter reaches a first predetermined value, and wherein the extraction circuit is adapted to reject the incoming data signal when the second counter reaches a second predetermined value.

15. The device of claim 14, wherein the RF communication is encoded according to at least one encoding scheme selected from the group consisting of Manchester- encoding, non-return to zero encoding, and binary encoding.

16. The device of claim 14, further comprising a divider circuit adapted to derive a plurality of clock frequencies and pass at least one frequency to the extraction circuit and to the edge detector circuit.

17. A digital squelch circuit arrangement adapted for use with a meter interface module of an automatic meter reading (AMR) system, the squelch circuit arrangement comprising:
means for detecting an inbound radio frequency (RF) data signal having a data rate, wherein the data rate is represented by a series of edges and wherein the squelch circuit arrangement is adapted to respond differently to a target data rate of an inbound RF data signal transmitted for use by the meter interface module than to a non-predetermined non-target data rate of any other signal;
means for detecting good edges corresponding to the at least one predetermined target data rate and bad edges corresponding to the non-predetermined non-target data rate within the inbound RF data signal;
means for determining whether the data rate of the inbound data signal as a function of the detected good edges and bad edges matches the target data rate of the squelch circuit arrangement;
means for processing the data within the data signal if the data rate matches the target data rate; and
means for terminating signal detection in response to a detected failure of the data rate to match the target data rate based on a count of bad edges exceeding a count of good edges.

18. The endpoint device meter interface module of claim 17, wherein said inbound data signal detection means includes an extraction circuit, and wherein said means for detecting good edges and bad edges within the inbound data signal comprises a digital squelch circuit arrangement that includes an edge detector circuit adapted to receive a quantized data signal from the extraction circuit and detect edges in the quantized data signal, wherein the edge detector circuit includes a first counter to track a number of good edges and a second counter to track a number of bad edges.

19. The AMR system of claim 1, wherein the meter interface module is further adapted to
detect edges corresponding to data transitions in the inbound communication, wherein good edges occurring in time intervals corresponding to the target data rate are tracked with a first counter, and bad edges occurring outside of the time intervals are tracked with a second counter; and
in response to the second counter reaching a second predetermined value before the first counter reaches a first predetermined value, produce the detection of the data rate that does not correspond to the target rate.

20. The AMR system of claim 1, wherein upon detection of an RF inbound signal the squelch circuit arrangement is adapted to initialize a device timer of the at least one endpoint device and start a communication capture and compare sequence in the at least one endpoint device, the squelch circuit arrangement further adapted to filter inbound signals until a valid communication is detected, wherein a valid communication comprises an inbound signal having a data rate that matches the target data rate, and wherein the squelch circuit arrangement is further adapted to decode and process the valid communication for communication data;
wherein a filtering arrangement of the squelch circuit arrangement is adapted to filter inbound communications upon detecting a base edge and a second edge so as to identify the second edge as a good edge or a bad edge as a function of a time of the edge, such that:
if the second edge is a good edge, a good count register of the filter arrangement is incremented, and
if the second edge is a bad edge, a bad count register of the filter arrangement is incremented and the good count register is cleared; and clearing the good count register;
wherein the filter arrangement is adapted to detect and identify subsequent edges as good edges or bad edges until the target data rate is detected;
wherein the squelch circuit arrangement is further adapted to perform a selectivity test after the second edge and subsequent edges are detected, wherein the selectivity test includes analysis of a time between the base edge and the second edge, a review of the bad count register and a review of the good count register to determine if the bad count register is below a predetermined limit;
wherein the inbound RF signal encoded according to at least one encoding scheme selected from the group consisting of: Manchester-encoding, non-return to zero encoding, and binary encoding.

21. The method of claim 9, wherein the starting of the communication capture and compare sequence in the squelch circuit arrangement includes:
initiating counting of good edges derived from the inbound RF communication signals to produce a first count, the good edges corresponding to the target data rate;
initiating counting of bad edges derived from the inbound RF communication signals to produce a second count, the bad edges corresponding to a data rate that is not the target data rate; and
wherein the stopping of the communication capture and compare sequence includes determining whether the second count reaches a second predetermined count value before the first count reaches a first predetermined count value.

22. The method of claim 9, wherein the filtering of the incoming communications further comprises:
detecting a base edge;
detecting a second edge and identifying the second edge as a good edge or a bad edge based upon a time of the edge, if the second edge is a good edge, incrementing a good count register, if the second edge is a bad edge, incrementing a bad count register;

detecting and identifying subsequent edges as good edges or bad edges until the target data rate is detected, until determining the target data rate is not present, or until a predetermined acquisition timeout is reached; and performing a selectivity test after the second edge and subsequent edges are detected, wherein the selectivity test includes:

analyzing a time between the base edge and the second edge;

reviewing the bad count register; and reviewing the good count register if the bad count register is below predetermined limit.

23. The automatic meter reading (AMR) system of claim 1, wherein the squelch circuit arrangement is adapted to detect whether the data rate corresponds to the target data rate by determining whether a counted value of good edges reaches a predetermined threshold before a counted value of bad edges reaches a predetermined threshold.

* * * * *